United States Patent
Mizobata

(10) Patent No.: US 8,708,418 B2
(45) Date of Patent: Apr. 29, 2014

(54) VEHICLE SEAT AND METHOD OF MANUFACTURING THE SAME

(75) Inventor: Hiroshi Mizobata, Seto (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 504 days.

(21) Appl. No.: 12/702,404

(22) Filed: Feb. 9, 2010

(65) Prior Publication Data

US 2010/0201178 A1     Aug. 12, 2010

(30) Foreign Application Priority Data

Feb. 10, 2009   (JP) .................................. 2009-028353
Nov. 11, 2009   (JP) .................................. 2009-257959

(51) Int. Cl.
*A47C 7/14*     (2006.01)

(52) U.S. Cl.
USPC .................................. 297/452.56; 297/440.2

(58) Field of Classification Search
USPC ............................. 297/452.56, 440.2, 440.22
See application file for complete search history.

(56) References Cited

U.S. PATENT DOCUMENTS

| | | | |
|---|---|---|---|
| 5,765,804 A | 6/1998 | Stumpf et al. | |
| 5,772,282 A | 6/1998 | Stumpf et al. | |
| 6,035,901 A | 3/2000 | Stumpf et al. | |
| 6,059,368 A | 5/2000 | Stumpf et al. | |
| 6,125,521 A | 10/2000 | Stumpf et al. | |
| 6,152,534 A | 11/2000 | Maeda et al. | |
| 6,231,125 B1 * | 5/2001 | Maeda et al. | ........ 297/452.56 X |
| 6,375,269 B1 | 4/2002 | Maeda et al. | |
| 6,386,634 B1 | 5/2002 | Stumpf et al. | |
| 6,588,842 B2 | 7/2003 | Stumpf et al. | |
| 6,702,390 B2 | 3/2004 | Stumpf et al. | |
| 6,722,741 B2 | 4/2004 | Stumpf et al. | |
| 6,726,286 B2 | 4/2004 | Sayers et al. | |
| 6,733,080 B2 | 5/2004 | Sayers et al. | |
| 6,786,544 B1 * | 9/2004 | Muraishi | .............. 297/452.56 X |
| 6,966,604 B2 | 11/2005 | Stumpf et al. | |
| 7,255,404 B2 * | 8/2007 | Neale | ........................ 297/452.56 |
| 7,594,700 B2 | 9/2009 | Stumpf et al. | |

(Continued)

FOREIGN PATENT DOCUMENTS

| JP | 3-21419 | 1/1991 |
|---|---|---|
| JP | 9-276089 | 10/1997 |

(Continued)

OTHER PUBLICATIONS

JAPANESE Office Action dated Sep. 24, 2013, along with English-language translation thereof.

*Primary Examiner* — Anthony D Barfield
(74) *Attorney, Agent, or Firm* — Greenblum & Bernstein, P.L.C.

(57) ABSTRACT

A vehicle seat is provided. The vehicle seat includes: a planar elastic body that has a frame body provided in a periphery of the planar elastic body, the planar elastic body stretched to the frame body; a cushion member disposed around the planar elastic body; and a backbone member, wherein a supporting surface configured to support a seated person is formed by the planar elastic body and the cushion member, the planar elastic body is assembled to the seat by fixing the frame body to the backbone member, and the cushion member is disposed to be overlaid on the periphery of the planar elastic body at a supporting surface side, the cushion member is covered by a skin material that is attached on the planar elastic body at the supporting surface side.

3 Claims, 9 Drawing Sheets

(56) References Cited

U.S. PATENT DOCUMENTS

| | | |
|---|---|---|
| 2001/0028188 A1 | 10/2001 | Stumpf et al. |
| 2005/0064149 A1 | 3/2005 | Iseki et al. |
| 2007/0145797 A1 | 6/2007 | Itakura |
| 2008/0284229 A1 | 11/2008 | Masunaga et al. |
| 2009/0121530 A1 | 5/2009 | Yasuda et al. |
| 2009/0302648 A1 | 12/2009 | Kato et al. |

FOREIGN PATENT DOCUMENTS

| | | |
|---|---|---|
| JP | 11-75986 | 3/1999 |
| JP | 11-151134 | 6/1999 |
| JP | 11-192136 | 7/1999 |
| JP | 11-192138 | 7/1999 |
| JP | 11-266959 | 10/1999 |
| JP | 11-266961 | 10/1999 |
| JP | 11-309048 | 11/1999 |
| JP | 11-342037 | 12/1999 |
| JP | 11-342038 | 12/1999 |
| JP | 11-342039 | 12/1999 |
| JP | 2000-125978 | 5/2000 |
| JP | 2001-137065 | 5/2001 |
| JP | 2002-102557 | 4/2002 |
| JP | 2002-172049 | 6/2002 |
| JP | 2002-233437 | 8/2002 |
| JP | 2002-240081 | 8/2002 |
| JP | 2002-253881 | 9/2002 |
| JP | 2004-90521 | 3/2004 |
| JP | 2004-105771 | 4/2004 |
| JP | 2004-121869 | 4/2004 |
| JP | 2004-141677 | 5/2004 |
| JP | 2005-160558 | 6/2005 |
| JP | 2006-110000 | 4/2006 |
| JP | 2006-110001 | 4/2006 |
| JP | 2006-122079 | 5/2006 |
| JP | 2007-117564 | 5/2007 |
| JP | 2008-73556 | 4/2008 |
| JP | 2008-264037 | 11/2008 |
| JP | 2009-172091 | 8/2009 |

* cited by examiner

VEHICLE SEAT AND METHOD OF MANUFACTURING THE SAME

CROSS REFERENCE TO RELATED APPLICATION

The present application claims priority from Japanese Patent Application No. 2009-028353, which was filed on Feb. 10, 2009, and from Japanese Patent Application No. 2009-257959 filed on Nov. 11, 2009, the disclosures of which are herein incorporated by reference in their entirety.

TECHNICAL FIELD

Apparatuses and devices consistent with the present invention relate to a vehicle seat and a method of manufacturing the same. More specifically, the present invention relates to a vehicle seat in which a supporting surface supporting a seated person is formed by a planar elastic body and a cushion member disposed around the planar elastic body, and a method of manufacturing the same.

BACKGROUND

There is a related art vehicle seat in which the supporting surface is formed of a planar elastic body. For example, Patent Document 1 discloses a net seat for a vehicle. In the net seat disclosed in Patent Document 1, a net is attached to a seat frame by hooking a hook of substantially J-shaped cross section sewn to an end of the net on a wire provided at the seat frame. In such a net seat, a variation in the stretching state of the net may occur due to variation in the sewing position of the hook.

In addition, as a net seat which is not used for a vehicle, but used in an office etc., there is a related art net seat in which a resin frame body is integrally formed at the periphery of a net and the entire periphery of the resin frame body is attached to a pipe frame to form a supporting surface (for example, refer to Patent Document 2). In such a net seat, the net is previously supported on the frame body in a stretched state by molding a resin frame body at the periphery of the net in a state in which the net is stretched in a die and mold. And, in this state, the frame body is attached to the seat frame, thereby the stretching state of the net is difficult to vary.

Patent Document 1: JP-A-2002-233437
Patent Document 2: JP-A-2004-90521

SUMMARY

However, if the net seat used in the office is applied to a seat for a vehicle, since the resin frame body is exposed to the periphery of the seating surface, it is difficult to secure seating comfort. In particular, it is difficult to secure the retaining capacity of a seated person in a case of rolling of the vehicle. Accordingly, it has been considered to additionally provide a cushion member at the side portion of the seating surface to cover the frame body. However, if the cushion member is additionally set, a little space may be generated between the net surface and the cushion member, and it is difficult to secure good appearance.

Therefore, an object of the invention is to provide a vehicle seat in which it is possible to decrease variation in the stretching state of the planar elastic body constituting the supporting surface and secure good seating comfort and good appearance.

According to an illustrative aspect of the present invention, there is provided a vehicle seat comprising: a planar elastic body that has a frame body provided in a periphery of the planar elastic body, the planar elastic body stretched to the frame body; a cushion member disposed around the planar elastic body; and a backbone member, wherein a supporting surface configured to support a seated person is formed by the planar elastic body and the cushion member, the planar elastic body is assembled to the seat by fixing the frame body to the backbone member, and the cushion member is disposed to be overlaid on the periphery of the planar elastic body at a supporting surface side, the cushion member is covered by a skin material that is attached on the planar elastic body at the supporting surface side.

Further, according to another illustrative aspect of the present invention, there is provided a method of manufacturing a vehicle seat in which a supporting surface supporting a seated person is formed by a planar elastic body and a cushion member disposed around the planar elastic body, the method comprising the steps of: attaching a skin material for covering the cushion member to the planar elastic body at a supporting surface side to form a planar elastic composite body; molding a frame body to a periphery of the planar elastic body in a die and mold such that the planar elastic body constituting the planar elastic composite body becomes a stretched state whereby a planar elastic composite body with frame is formed; and fixing the frame body of the planar elastic composite body with frame to a backbone member of a seat and disposing the cushion member to be overlaid on the periphery of the planar elastic body at the supporting surface side so as to be covered with the skin material.

With a vehicle seat according to the first illustrative aspect of the invention, it is possible to reduce variation in the stretching state of the planar elastic body and secure good seating comfort and good appearance.

With a method of manufacturing the vehicle seat according to the second illustrative aspect of the invention, it is possible to easily manufacture the vehicle seat according to the first aspect of the invention. In addition, if a positioning hook is integrally attached to the back surface side of the planar elastic composite body and the positioning hook is fit into a positioning recess in a die and mold, positioning of the skin material with respect to the frame body is easily and reliably performed, and it is possible to more easily and uniformly manufacture the vehicle seat according to the first aspect of the invention. In addition, if a skin material receiving recess for receiving the skin material which is integrally attached to the planar elastic composite body is provided in the die and mold, it is easy to further reduce variation in the stretching state of the planar elastic body.

BRIEF DESCRIPTION OF THE DRAWINGS

Illustrative aspects of the invention will be described in detail with reference to the following figures wherein.

DETAILED DESCRIPTION OF EXEMPLARY EMBODIMENTS OF THE PRESENT INVENTION

Figure 1:
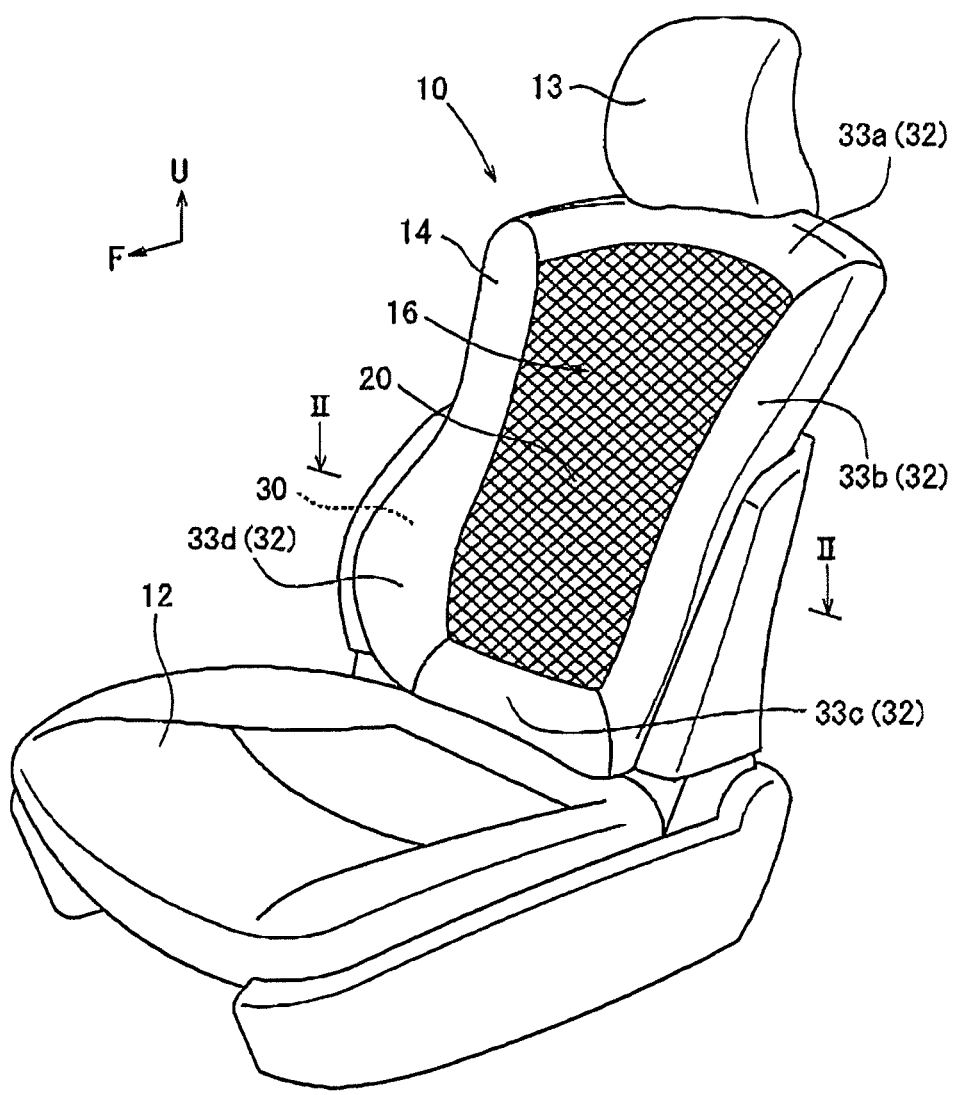
FIG. 1 is a perspective view of a vehicle seat according to an embodiment of the invention.

Hereinafter, descriptions regarding the exemplary embodiment of the invention will be given with reference to the accompanying drawings. A vehicle seat 10 according to the exemplary embodiment is a seat which is mounted to a vehicle such as an automobile. And, as shown in FIG. 1, the vehicle seat 10 includes a seat cushion 12 serving as a seating surface, a seat back 14 serving as a backrest, and a head rest 13. The seat cushion 12 elastically supports the load of the seated person by a skin-covered cushion member. The seat back 14 is a net 20 in which a portion of the supporting surface 16 supporting the seated person is a planar elastic body. In this embodiment, the seat back 14 is an object to which the invention is applied. Accordingly, hereinafter, the seat back 14 will be described in detail. Directions as indicated by arrows F and U in each of the drawings indicate a front direction and an upper direction of the net seat 10. Further, in following description, unless otherwise noted, with regard to a front surface and a back surface of each member such as the net 20, the front surface refers to a surface which faces to outside of the seat back 14 whereas the back surface refers to a surface which faces to inside of the seat back 14 opposite to the front surface.

First, a configuration of the net seat 10 will be described.

Figure 2:
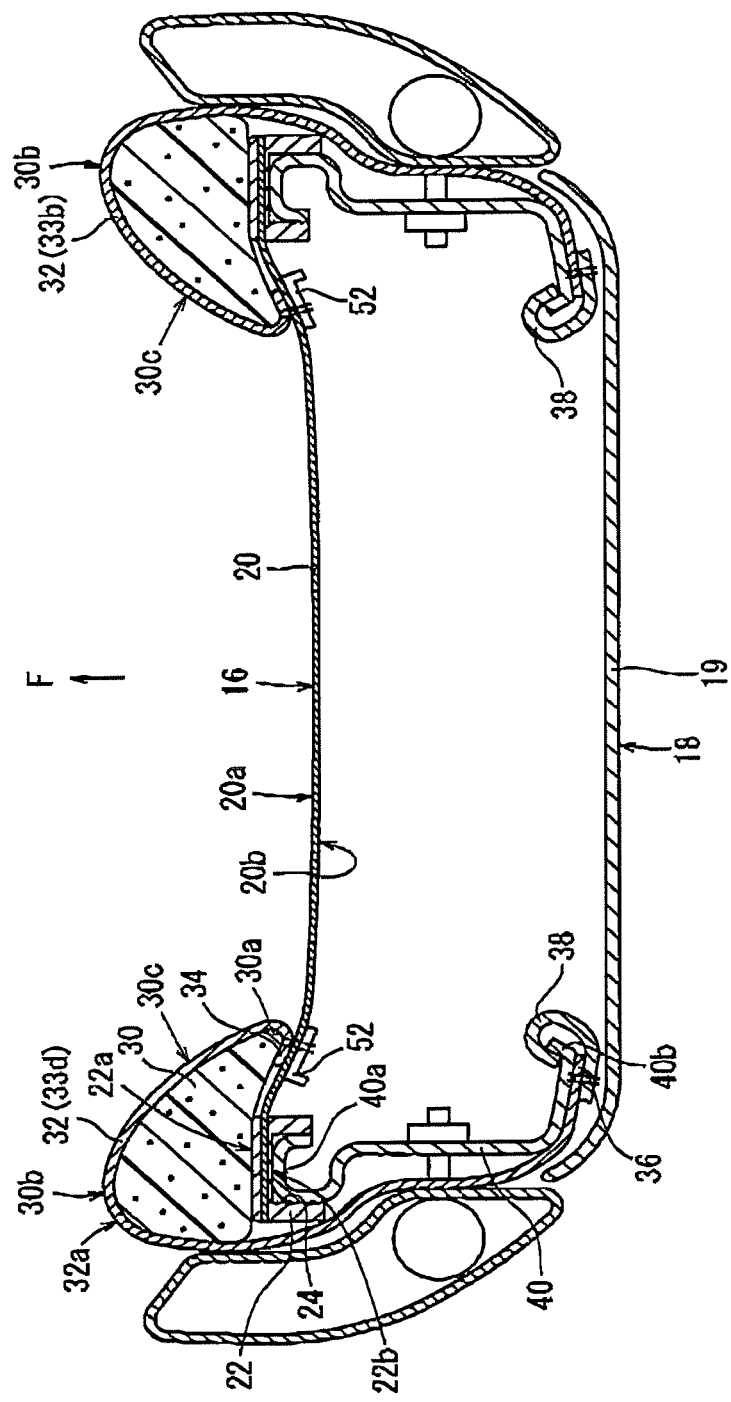
FIG. 2 is a sectional view taken along line II-II of the vehicle seat shown in FIG. 1.

A supporting surface 16 of the seat back 14 is formed by a net 20 and a cushion member 30 which is disposed all around the net 20. The net 20 is a woven or knitted fabric etc. formed in a mesh shape. The cushion member 30 is formed of a urethane foam etc., and its surface is covered by a skin material 32. The skin material 32 can be formed of various fabrics such as a woven fabric, a knitted fabric and a leather etc. In the exemplary embodiment, the skin material 32 is formed of the same material as that of the net 20 to produce an overall unified feeling of the supporting surface 16. On the other hand, as shown in FIG. 2, a rear surface 18 of the seat back 14 opposite to the supporting surface 16 is a backboard 19 formed of a composite resin such as a polypropylene.

The net 20 is stretched to a frame body 22 which is integrally provided at a peripheral edge of the net to surround all around the net. The frame body 22 is formed of a composite resin such as a polypropylene. The frame body 22 includes a substantially flat front surface 22a and a back surface 22b having a recess 24 into which a back frame 40 can be fitted. The back frame 40 is a backbone member of the seat back 14, and is a substantially gate-shaped rigid body. The recess 24 of the frame body 22 is engaged with one end 40a at a side of the supporting surface 16 of the back frame 40 so that the net 20 can be assembled in a state of being stretched.

The cushion member 30 is disposed to be overlaid on a periphery of the front surface 20a of the net 20 (a surface which constitutes the supporting surface 16) so as to cover the frame body 22 which is integrally provided to edge end of the net 20 and a part of the front surface of the net 20. The cushion member 30 is formed to be thinner towards a center side of the supporting surface 16 and thicker towards outside of the supporting surface 16, and is formed to be protuberant towards outside of the supporting surface 16.

As shown in FIG. 1, the skin material 32 covering the surface of the cushion member 30 is made by sewing a plurality of skin pieces 33a to 33d formed by cutting a web such as fabric or leather. As shown in FIG. 2, the skin material 32 according to this embodiment is made by joining the ends corresponding to four corners of four band-shaped skin pieces 33a to 33d corresponding to four peripheral sides of the supporting surface 16 in a ring shape. One margin 34 positioned at a center side of the supporting surface 16 in a state in which the skin material 32 has covered the cushion member 30 is integrally attached to the net 20 by being sewn to a front surface 20a of the net 20 along an edge end 30a of the cushion material 30 at a center side of the supporting surface 16. A hook 38 of J-shaped section is sewn to another margin 36 of the skin material 32 positioned at an outside of the supporting surface 16 and is latched to another end 40b of the back frame 40 at a rear surface side.

Next, a method of manufacturing the net seat 10 will be described.

Figure 3:
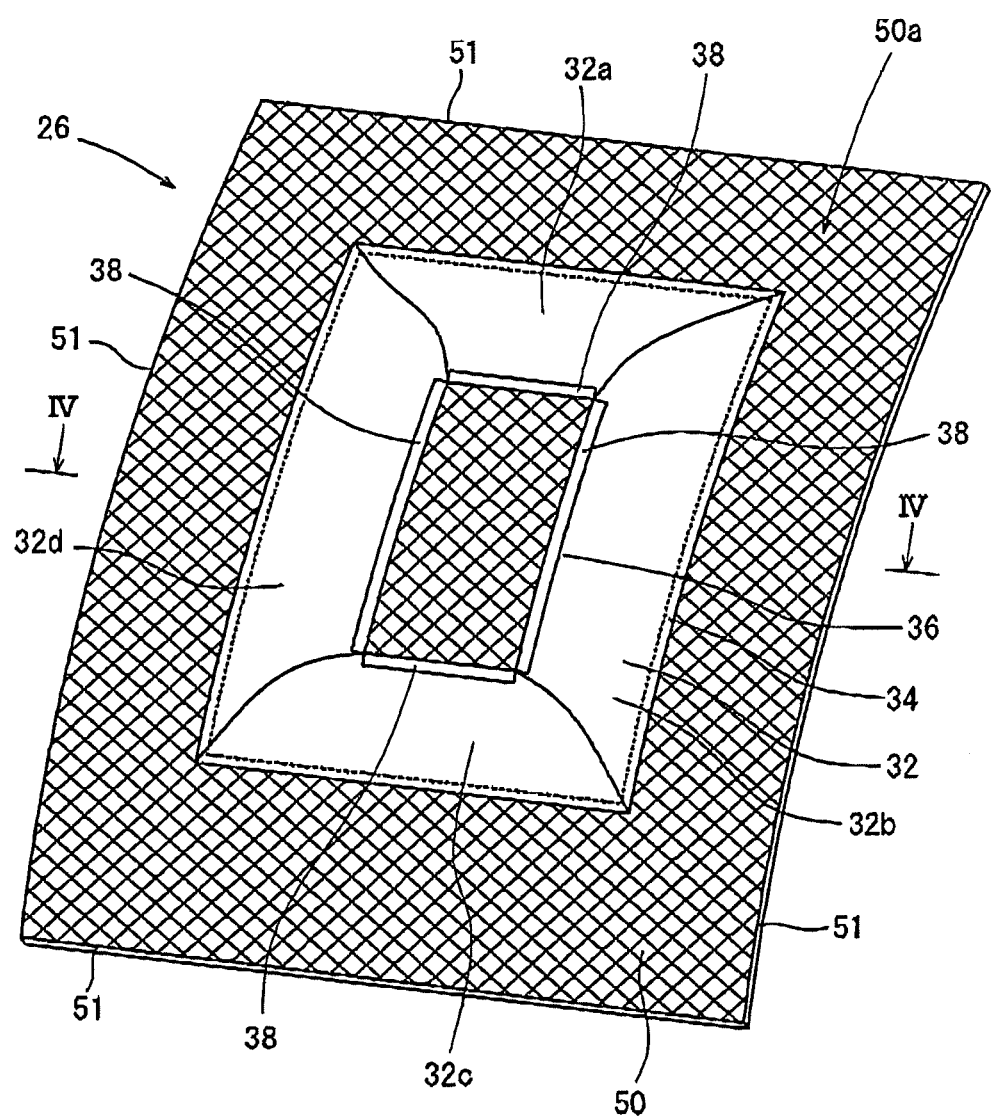
FIG. 3 is a perspective view of a net composite body according to an embodiment of the invention.
Figure 4:
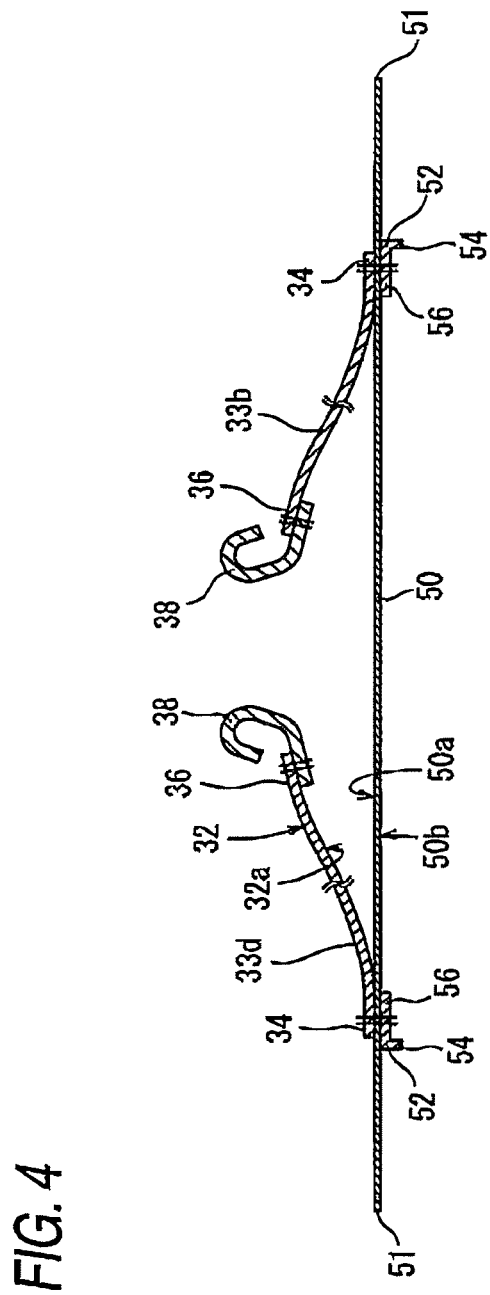
FIG. 4 is a sectional view taken along line IV-IV of the net composite body shown in FIG. 3.

Firstly, as shown in FIGS. 3 and 4, a net composite body 26 is formed. This net composite body 26 corresponds to a planar elastic composite body. The net composite body 26 is made by sewing a skin material 32 to a surface 50a of the net web (after, called as a net web to be distinguished for easy understanding) 50 before disposing the frame body 22 around it. The net web 50 is cut to be sized larger than the net 20 assembled to the seat back 14. It is possible to easily sew the skin material 32 to the net web 50 by overlaying the surface 32a of the skin material 32 to a surface 50a of the net web 50 in a state of being opposite to each other and sewing one margin 34 of the skin material 32 to the net web 50 in a matched state. Further, in FIG. 3, sewing lines are shown as broken lines.

As shown in FIG. 4, a positioning hook 52 which can be used when forming a net composite body 28 with frame at a following process is integrally attached to a back surface 50b of the net web 50 constituting the net composite body 26 by sewing. The positioning hook 52 has a projecting portion 54 which projects from the back surface 50b of the net web 50 and a sewing portion 56 connected substantially perpendicularly to a base end of the projecting portion 54. The positioning hook 52 is disposed at the back surface 50b of the location at which one margin 34 of the skin material 32 is sewn, the sewing portion 56 is sewn to the net web 50 to follow the back surface 50b of the net web 50, and the projecting portion 54 is provided to a back surface 50b side of the net web 50 in a state of being projected from outside end of the sewing portion 56. Sewing of the positioning hook 52 to the net web 50 is performed, preferably, when sewing the skin material 32 to the net web 50 to form the net composite body 26.

Figure 5:
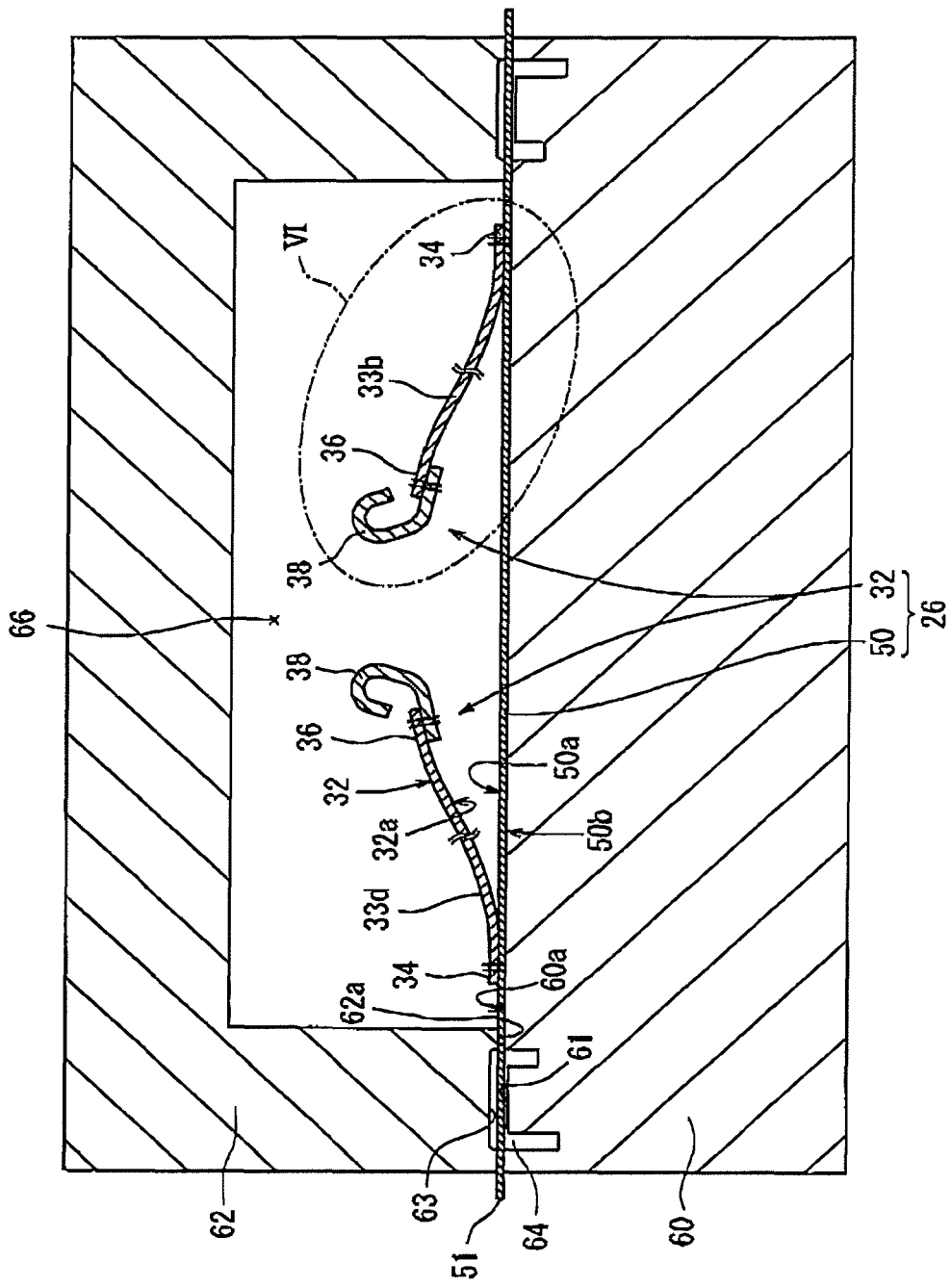
FIG. 5 is a sectional view showing a method of molding a net composite body with frame according to an embodiment of the invention, in which a mold is shown to correspond to a section of the net composite body shown in FIG. 4.
Figure 7:
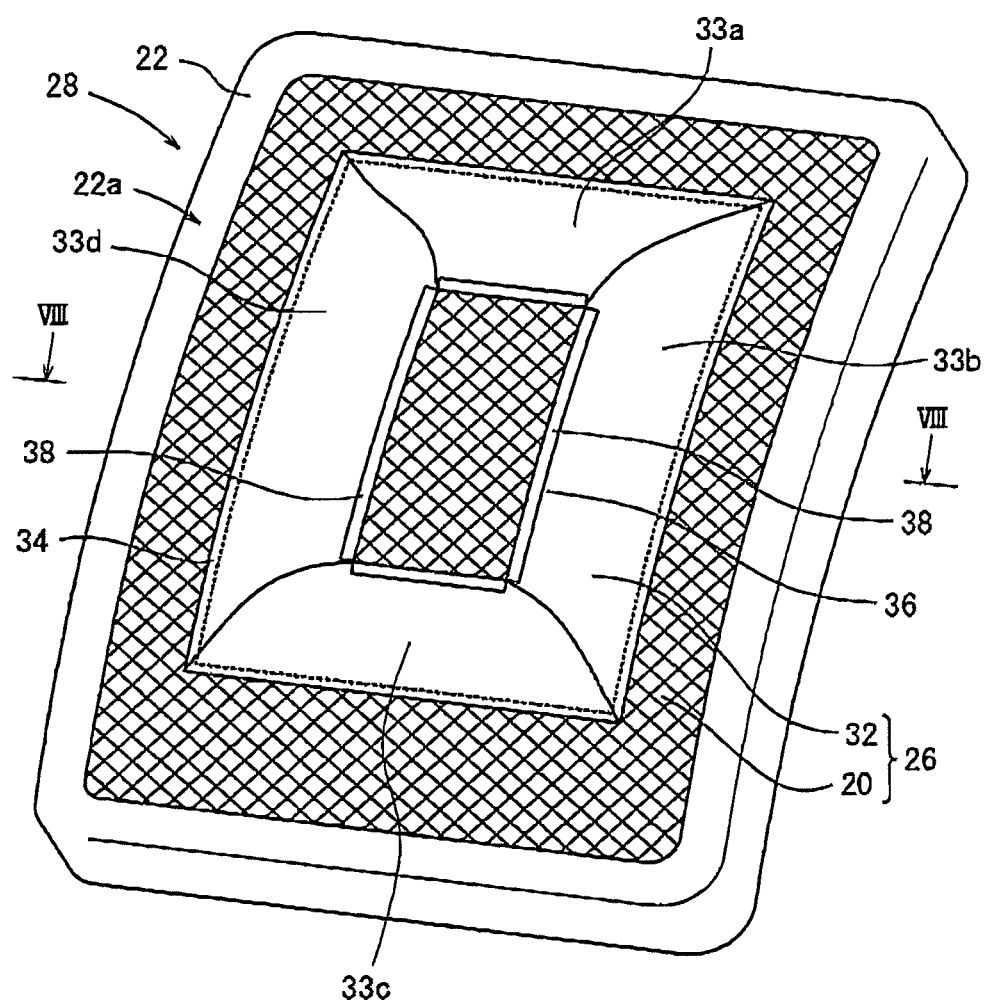
FIG. 7 is a perspective view of a net composite body with frame according to an embodiment of the invention.

Next, as shown in FIG. 7, the net composite body 28 with frame is formed. The net composite body 28 with frame is made by forming the frame body 22 integrally with the net composite body 26. The net composite body 28 with frame corresponds to a planar elastic composite body with frame. The net composite body 28 with frame can be molded, as shown in FIG. 5, by using a die and mold composed of two molds 60 and 62. That is, in a state in which the net composite body 26 is pinched between the molding surfaces 60a and 62a of the molds 60 and 62, which are opposite to each other, a molten resin material is flown into a resin frame molding space 64 formed between the molding surfaces 60a and 62a so as to mold the frame body 22, so that the net composite body 28 with frame can be formed.

Figure 6:
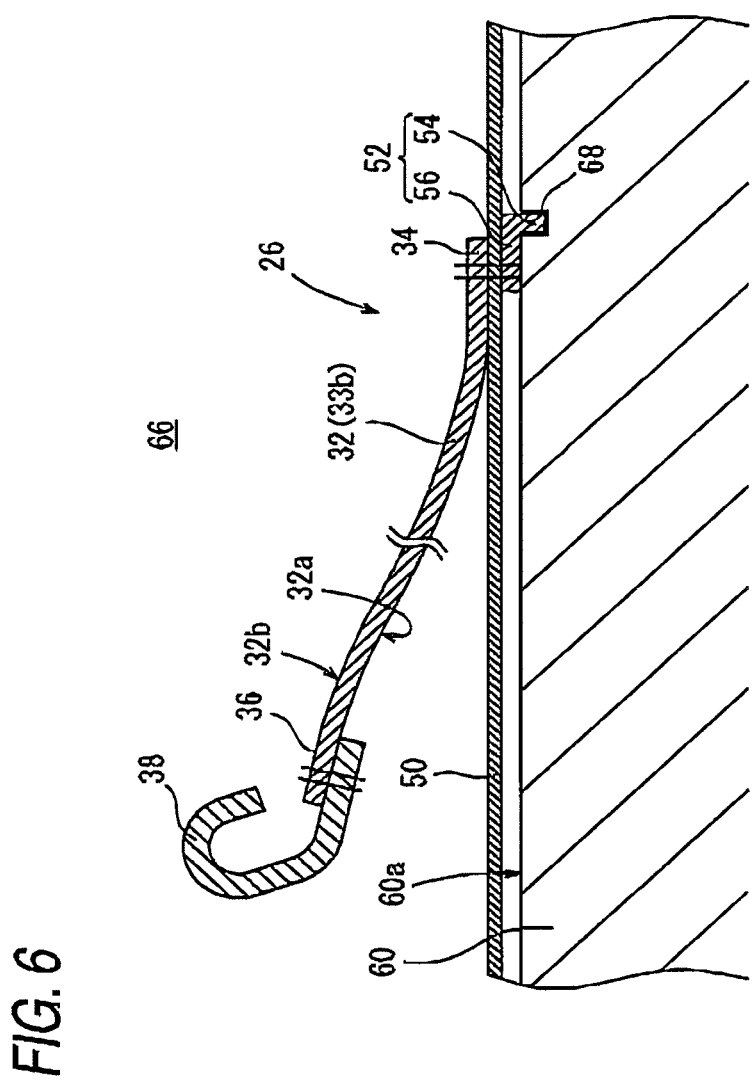
FIG. 6 is a sectional view showing a VI portion in FIG. 5 in an enlarged manner.

One side mold 60 pinches the net composite body 26 by its molding surface 60a from the back surface 50b side of the net web 50. The molding surface 60a of the one side mold 60 is substantially flat in its center, and a molding recess 61 to produce a shape of the back surface 22b side of the frame body 22 is formed all around the molding surface 60a. In addition, as shown in FIG. 6, the molding surface 60a of the one side mold 60 has a positioning recess 68 at a position nearer to a center than the molding recess 61, into which the projecting portion 54 of the positioning hook 52 provided to the net composite body 26 is fitted.

Returning to FIG. 5, the other side mold 62 pinches the net composite body 26 by its molding surface 62a from the front surface 50a side of the net web 50. A skin material receiving recess 66 which can receive the skin material 32 is formed at a center of the molding surface 62a of other side mold 62. The skin material receiving recess 66 has a size to include a location at which the skin material 32 is sewn to the net web 50 (one margin 34 of the skin material 32) and a height which can receive all the skin material 32 in a state in which the skin material 32 is tilted to a center side. A molding recess 63 to produce a shape of the front surface 22a side of the frame body 22 is formed all around the molding surface 62a of the other side mold 62. The resin frame molding space 64 is constructed by a space formed between the molding recess 61 of one side mold 60 and the molding recess 63 of the other side mold 62 by closing one side mold 60 and the other side mold 62.

When molding the net composite body 28 with frame, firstly, the net composite body 26 is disposed between the molding surface 60a of one side mold 60 and the molding surface 62a of the other side mold 62. At this time, the net composite body 26 is disposed such that the skin material 32 is received in the skin material receiving recess 66 and a peripheral edge portion 51 of the net web 50 runs over outwards from the resin frame molding space 64. By fitting the projecting portion 54 of the positioning hook 52 provided at the net composite body 26 into the positioning recess 68 formed at the molding surface 60a of one side mold 60, it is possible to perform a relative positioning between the molds 60 and 62 of the net composite body 26. That is, by determining the relative positions between the resin frame molding space 64 and the skin material 32, it is possible to accurately determine the arrangement of the skin material 32 with respect to the frame body 22 to be molded. In other words, it is possible to accurately determine the arrangement of the skin material 32 in the supporting surface 16.

Next, one side mold 60 and the other side mold 62 are closed. In this embodiment, the one side mold 60 is a core type mold and the other side mold 62 is a cavity type mold. The one side mold 60 of core type is moved with respect to the other stationary side mold 62 of cavity type and clamped thereto. At this time, the net web 50 of the net composite body 26 is held in a stretched state by the molds 60 and 62. Next, a molten resin material is poured into the resin frame molding space 64. The resin material can flow down to the front side and the back side through a mesh structure of the net web 50, and fills the resin frame molding space 64. Accordingly, in a state in which the net web 50 has been buried, the frame body 22 is molded. After the frame body 22 has been cooled and solidified, the molds are opened to take out the molded article which is unified from the net composite body 26 and the frame body 22. Next, the peripheral edge portion 51 of the net web 50 running over outwards from the frame body 22 is cut out. Through the foregoing processes, as shown in FIG. 7, the net composite body 28 with frame which holds the net 20 in a state in which the frame body 22 is stretched is obtained.

Further, although the net composite body 28 with frame is schematically shown in FIG. 7, it is possible to make it in a shape to easily follow the seated person's body by stretching the net 20 in a state of being curved by a three-dimensional molding such as a molding of the frame body 22 with proper curving.

Figure 8:
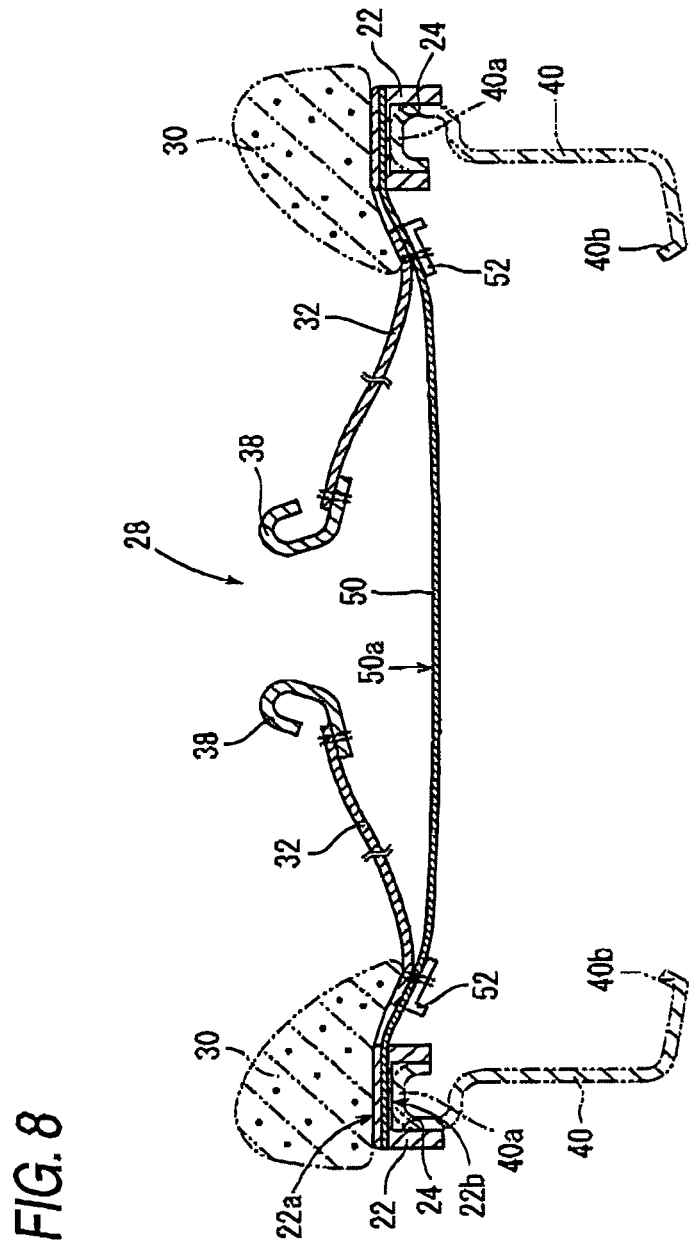
FIG. 8 is a sectional view taken along line VIII-VIII of the net composite body with frame shown in FIG. 7.

Next, as shown in FIG. 8 by a two-dot chain line, the net composite body 28 with frame is assembled to the back frame 40. By fitting the fitting recess 24 formed on a back surface 22b of the frame body 22 over a front one end 40a of the back frame 40, it is possible to easily assemble the net composite body 28 with frame to the back frame 40.

Next, as shown in FIG. 8 by a two-dot chain line, in a state in which the cushion member 30 is overlaid on the front surface 22a of the frame body 22 and a part of the net 20, the other margin 36 equipped with the hook 38 of the skin material 32 is opened outward to wrap the cushion member 30, and then the hook 38 is latched to the other end 40b of the back frame 40 at the rear surface side. Thus, as shown in FIG. 2, the supporting surface 16 is formed. Further, since the positioning hook 52 used in the process of forming the net composite body 28 with frame does not affect a capacity such as seating comfort even if it remains at the back surface 20b side of the net 20, the hook remaining there creates no problem.

With the configuration of the net seat 10 as described above, the following effects are achieved.

The net 20 is assembled to the back frame 40 with a configuration of the net composite body 28 with frame which is stretched to the frame body 22 provided integrally at a periphery in advance. Therefore, it is possible to reduce variation in the stretching state of the net 20 and stabilize seating comfort.

In addition, since the frame body 22 is covered by the cushion member 30 at its front surface 22a and does not expose to the supporting surface 16, it does not reduce seating comfort, but adds a function to hold the seated person by the cushion member 30, whereby it is possible to improve seating comfort (riding comfort) even when the vehicle is traveling.

Figure 9:
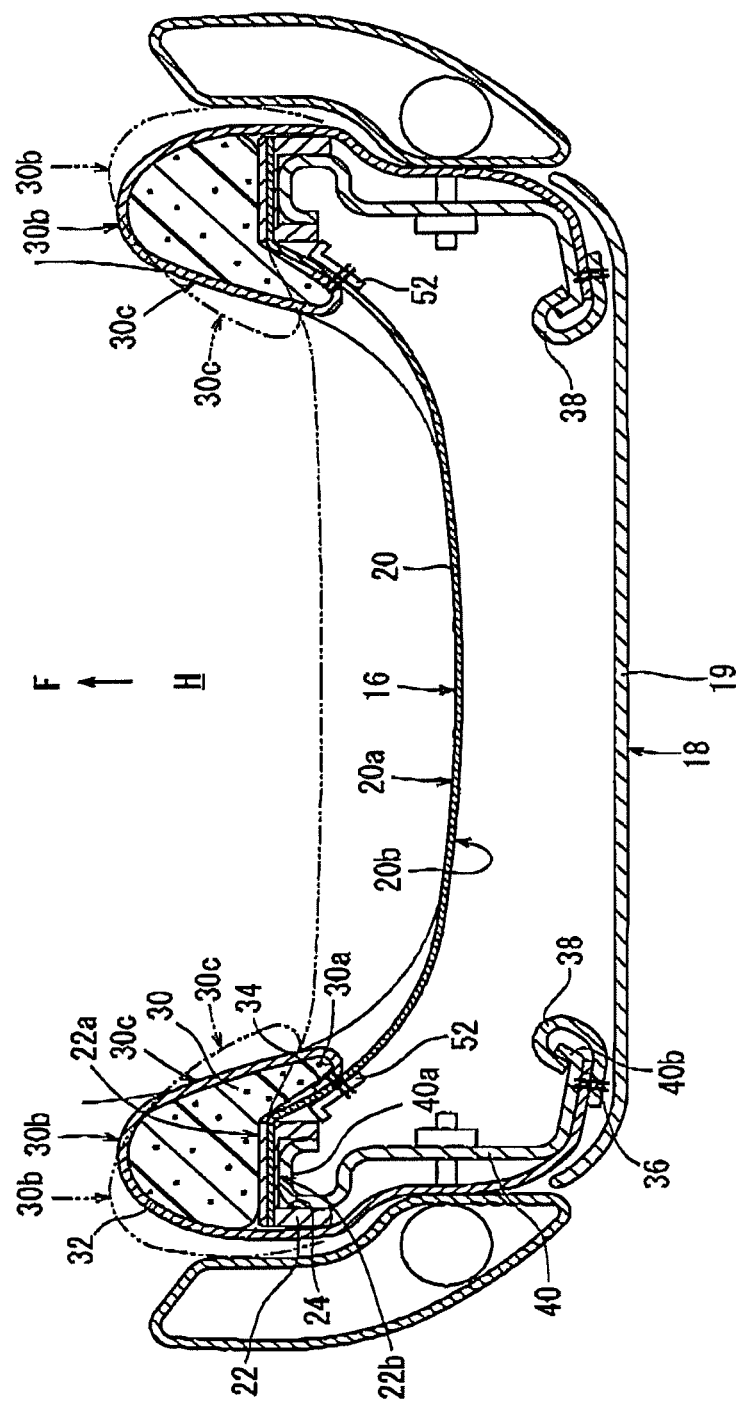
FIG. 9 is a sectional view showing a state in which a load of the seated person is applied to the vehicle seat shown in FIG. 2.

Especially, according to the exemplary embodiment of the present invention, as shown in FIG. 2, the cushion member 30 is a substantially, triangle shape in section and is formed to be thinner towards a center side of the supporting surface 16 and thicker towards outside of the supporting surface 16. And, the inclined portion 30c, which descends from the top portion 30b positioned at the outside of the supporting surface 16 to the edge end 30a positioned at the center side of the supporting surface, is formed. And, the cushion member 30 overhangs towards the center side of the supporting surface 16 over the frame body 22, and the cushion member 30 is overlapped on the frame body 22 and a portion of the net 20. The one margin 34 of the skin material 32, covering the cushion member 30, is sewn to the net 20 along the edge end 30a of the cushion member 30 on the center side. Therefore, as shown in FIG. 9, the one margin 34 of the skin material 32, covering the cushion member 30, is pulled to a backward direction in response to that the net 20 bends to the backward direction when the load of the seated person H is applied to the supporting surface 16, thereby, a force for pushing out the cushion member 30 from the outside of the supporting surface 16 to the center side and backward direction is applied to the cushion member 30. As a result, the cushion member 30 is deformed from a shape shown by solid line in FIG. 9 to a shape to which the load of the seated person H is not applied as shown by dashed chain line in FIG. 9. And, the cushion member 30 is slipped on the front surface 22a of the frame body 22 and is deformed toward the center side. The top portion 30b is also moved to the center side (seated person H side), the end edge 30a of the center side is deformed to the backward direction, and the inclination of the inclined portion 30c becomes to be larger. Therefore, the seated person H can be nipped and retained by the right and left cushion members 30, thereby it is possible to enhance a retaining capacity (holding capacity) of the seated person.

In addition, there is a case in which the resin material runs over in the surface direction of the net web 50 due to the mesh structure of the net web 50 upon molding the frame body 22 and thus a burr is generated. However, since the burr is hidden by the cushion member 30 even in a case in which the burr is generated, it is not exposed to the supporting surface 16 and does not deteriorate appearance.

In addition, one margin 34 of the skin material 32, covering the cushion member 30, on a center side of the supporting surface 16 is previously sewn to the front surface 20a of the net 20 along the position at which the edge end 30a of the cushion member 30 on a center side is disposed. Therefore, in the supporting surface 16, floating of the cushion member 30 with respect to the net 20 is not generated and thus appearance is good.

In addition, the skin material 32 can be easily sewn since it is sewn to the net web 50 prior to be stretched.

In addition, in a case in which the frame body 22 is integrally molded to the net web 50 sewn to the skin material 32 (the net composite body 26), since the skin material receiving recess 66 is formed at the other side mold 62 and can receive the skin material 32, it is possible to pinch the net web 50 with a constant stretching state to the molds 60 and 62 even if the skin material 32 is sewn to the net web.

In addition, the net composite body 26 can be easily positioned with respect to the one side mold 60 by fitting the projecting portion 54 of the positioning hook 52 provided on the back surface 50b into the positioning recess 68 provided on the molding surface 60a of the one side mold 60, and it is possible to easily perform the positioning of the skin material 32 on the supporting surface 16.

Further, the present invention can be implemented as various other embodiments within the scope without departing from the gist of the invention.

For example, it is also possible to apply, in place of the net 20, a planar elastic body having a non-mesh shape formed of a woven or knitted fabric or the like which can elastically support the seated person.

In addition, although an embodiment in which the present invention is applied to the seat back 14 is illustrated in the foregoing, the present invention may be applied to the seat cushion 12 or the head rest 13.

In addition, although the hook 38 of the skin material 32 is engaged with the edge portion of the back frame 40 in FIG. 9, the hook 38 of the skin material can be engaged with an edge portion of the frame body 22.

As described above, according to a first aspect of the present invention, there is provided a vehicle seat comprising: a planar elastic body that has a frame body provided in a periphery of the planar elastic body, the planar elastic body stretched to the frame body; a cushion member disposed around the planar elastic body; and a backbone member, wherein a supporting surface configured to support a seated person is formed by the planar elastic body and the cushion member, the planar elastic body is assembled to the seat by fixing the frame body to the backbone member, and the cushion member is disposed to be overlaid on the periphery of the planar elastic body at a supporting surface side, the cushion member is covered by a skin material that is attached on the planar elastic body at the supporting surface side.

With a configuration according to a first aspect of the invention, since the planar elastic body is stretched on a frame body which is integrally provided in advance at the periphery of the planar elastic body, and is assembled to the seat by fixing the frame body to a backbone member of the seat, it is possible to reduce variation in the stretching state of the planar elastic body. In addition, since the frame body is covered by the cushion member disposed to be overlaid on the periphery of the planar elastic body at the supporting surface side, seating comfort is not deteriorated by the frame body and it is possible to enhance seating comfort by securing a retaining capacity of a seated person. In addition, since the skin material covering the cushion member is integrally attached to the supporting surface side of the planar elastic body, the cushion member does not float with respect to the planar elastic body and thus appearance is good.

According to a second aspect of the invention, there is provided a method of manufacturing a vehicle seat in which a supporting surface supporting a seated person is formed by a planar elastic body and a cushion member disposed around the planar elastic body, the method comprising the steps of: attaching a skin material for covering the cushion member to the planar elastic body at a supporting surface side to form a planar elastic composite body; molding a frame body to a periphery of the planar elastic body in a die and mold such that the planar elastic body constituting the planar elastic composite body becomes a stretched state whereby a planar elastic composite body with frame is formed; and fixing the frame body of the planar elastic composite body with frame to a backbone member of a seat and disposing the cushion member to be overlaid on the periphery of the planar elastic body at the supporting surface side so as to be covered with the skin material.

With a configuration according to a second aspect of the invention, the skin material is integrally attached to the supporting surface side of the planar elastic body before the planar elastic body is stretched to construct a planar elastic composite body with frame, i.e., prior to stretching, so that a planar elastic composite body is formed. For this reason, it is possible to easily attach the skin material to the planar elastic body and easily manufacture the vehicle seat according to the first aspect of the invention.

According to a third aspect of the invention, in addition to the second aspect of the invention, a positioning hook is attached to a back surface of a location at which the skin material of the planar elastic body constituting the planar elastic composite body is attached; and the positioning hook is fit into a positioning recess formed in the die and mold so as to perform positioning of the planar elastic composite body with respect to the die and mold.

Accordingly, since it is possible to easily position the planar elastic composite body with respect to the die and mold and the positioning of the skin material with respect to the frame body is reliably performed, the skin material is easily arranged at a predetermined position on the supporting surface.

According to a fourth aspect of the present invention, in addition to the second aspect of the invention, wherein in molding the frame body to the periphery of the planar elastic body constituting the planar elastic composite body in the die and mold, the skin material is received in a skin material receiving recess formed in the die and mold.

Accordingly, it is easy to make the planar elastic body in a stably stretched state in a die and mold and to further reduce variation in the stretching state of a planar molding body.

Further, according to a fifth aspect of the invention, in addition to the first aspect, wherein a first end portion of the skin material is attached to the planar elastic body and a second end portion of the skin material which is opposite to the first end portion is attached to the backbone member.

Further, according to a sixth aspect of the present invention, in addition to the first aspect, wherein a first end portion of the skin material is attached to the planar elastic body and a second end portion of the skin material which is opposite to the first end portion is attached to the frame body.

What is claimed is:

1. A vehicle seat comprising:
    a planar elastic body that has a frame body provided in a periphery of the planar elastic body, the periphery of the planar elastic body being disposed within the frame body such that the frame body surrounds the periphery of the planar elastic body, the planar elastic body being stretched to the frame body;
    a cushion member disposed around the planar elastic body; and
    a backbone member having a first side end provided at the frame body and a second side end that projects away from the frame body in a direction generally orthogonal to the planar elastic body, wherein
    the planar elastic body and the cushion member define a supporting surface configured to support a seated person,
    the frame body includes a recess configured to engage with the backbone member such that the planar elastic body is assembled to the seat,
    the cushion member is disposed to be overlaid on the periphery of the planar elastic body at a supporting surface side, and
    the cushion member is covered by a skin material, the skin material having a first end portion that is directly attached on the planar elastic body at the supporting surface side and a second end portion provided at an opposite side of the supporting surface side with an engagement member that is attached to the second side end of the backbone member.

2. The vehicle seat according to claim 1, wherein the frame body includes a front surface facing the cushion member and a back surface having the recess that engages with the first side end of the backbone member.

3. The vehicle seat according to claim 2, wherein the recess engages a first end of the backbone member such that the planar elastic body is attached to the vehicle seat in a stretched state.

* * * * *